United States Patent
Hines (12) United States Patent (10) Patent No.: US 8,550,690 B2
(45) Date of Patent: Oct. 8, 2013

(54) METHOD AND DEVICE FOR DISPENSING LIQUIDS

(75) Inventor: Kelly Hines, Spruce Grove (CA)

(73) Assignee: Construction Research & Technology GmbH (DE)

( * ) Notice: Subject to any disclaimer, the term of this patent is extended or adjusted under 35 U.S.C. 154(b) by 1034 days.

(21) Appl. No.: 11/906,210

(22) Filed: Oct. 1, 2007

(65) Prior Publication Data

US 2008/0308167 A1    Dec. 18, 2008

Related U.S. Application Data

(60) Provisional application No. 60/923,235, filed on Apr. 13, 2007.

(51) Int. Cl.
*B28C 5/02* (2006.01)
*B01F 15/02* (2006.01)

(52) U.S. Cl.
USPC .............................. 366/3; 366/138; 366/152.2

(58) Field of Classification Search
USPC .................. 222/145.2; 366/138, 6, 8, 31, 40, 366/159.1, 136, 137, 2, 3, 152.2
See application file for complete search history.

(56) References Cited

U.S. PATENT DOCUMENTS

| | | | |
|---|---|---|---|
| 1,656,002 A * | 1/1928 | Johnson | 366/8 |
| 2,138,172 A * | 11/1938 | Johnson | 366/8 |
| 2,748,990 A * | 6/1956 | Kemper | 222/373 |
| 2,863,649 A | 12/1958 | Grubb et al. | |
| 3,067,987 A | 6/1959 | Ballou et al. | |
| 3,018,922 A * | 1/1962 | Williamson | 222/25 |
| 3,424,349 A * | 1/1969 | Vance | 222/145.2 |
| 3,593,966 A * | 7/1971 | Munroe | 366/40 |
| 3,857,550 A | 12/1974 | Knipp et al. | |
| 4,106,111 A | 8/1978 | Rose | |
| 4,155,508 A | 5/1979 | Fiorentini | |
| 4,223,811 A | 9/1980 | Czegledi | |
| 4,265,266 A * | 5/1981 | Kierbow et al. | 137/101.19 |
| 4,320,775 A | 3/1982 | Stirling et al. | |
| 4,332,335 A | 6/1982 | Fiorentini | |
| 4,471,887 A | 9/1984 | Decker | |
| 4,691,850 A * | 9/1987 | Kirschmann et al. | 222/642 |

(Continued)

FOREIGN PATENT DOCUMENTS

| | | | | |
|---|---|---|---|---|
| CA | 2300184 | | 3/1999 | |
| DE | 3436813 C1 * | 5/1986 | | B28C 7/12 |

(Continued)

OTHER PUBLICATIONS

DE 3436813 C1 machine translation (EPO) Jun. 12, 2009.*

(Continued)

*Primary Examiner* — Tony G Soohoo
(74) *Attorney, Agent, or Firm* — Curatolo Sidoti Co., LPA; Joseph G. Curatolo (57) ABSTRACT

Disclosed is a method and apparatus for dispensing a user-defined quantity of one or more liquids for use in a cementitious mixture. The method includes moving a liquid from a liquid supply to a manifold; moving the liquid from the manifold to a flow meter; measuring the liquid while it moves through the flow meter; moving the liquid to a cementitious mixture; repeating these steps for any additional liquids; flushing any remaining liquid from the manifold with a purgative fluid; and moving purgative fluid and flushed liquid to the cementitious mixture.

19 Claims, 3 Drawing Sheets

(56) References Cited

U.S. PATENT DOCUMENTS

| | | | |
|---|---|---|---|
| 4,773,764 A * | 9/1988 | Colombani et al. | 366/160.2 |
| 4,778,083 A | 10/1988 | Decker | |
| 4,804,111 A | 2/1989 | Ricciardi et al. | |
| 4,993,884 A | 2/1991 | Mueller et al. | |
| 5,014,211 A | 5/1991 | Turner et al. | |
| 5,066,522 A | 11/1991 | Cole et al. | |
| 5,159,962 A * | 11/1992 | Dow | 141/98 |
| 5,190,075 A | 3/1993 | Tentler et al. | |
| 5,340,211 A | 8/1994 | Pratt | |
| 5,597,949 A | 1/1997 | Kalotay | |
| 5,654,502 A | 8/1997 | Dutton | |
| 5,661,225 A | 8/1997 | Ridgeway et al. | |
| 5,713,486 A | 2/1998 | Beech | |
| 5,823,262 A | 10/1998 | Dutton | |
| 5,866,795 A | 2/1999 | Wang et al. | |
| 5,908,240 A * | 6/1999 | Hood | 366/18 |
| 6,042,258 A * | 3/2000 | Hines et al. | 366/8 |
| 6,073,483 A | 6/2000 | Nitecki et al. | |
| 6,186,193 B1 | 2/2001 | Phallen et al. | |
| 6,212,959 B1 * | 4/2001 | Perkins | 73/861.77 |
| 6,345,646 B1 | 2/2002 | Ragsdale et al. | |
| 6,348,091 B1 * | 2/2002 | Affeldt et al. | 106/504 |
| 6,454,860 B2 | 9/2002 | Metzner et al. | |
| 6,475,560 B2 | 11/2002 | Dodd | |
| 6,491,421 B2 * | 12/2002 | Rondeau et al. | 366/8 |
| 6,572,255 B2 * | 6/2003 | Husher | 366/132 |
| 6,598,457 B2 | 7/2003 | Sullivan et al. | |
| 6,708,573 B1 | 3/2004 | Cohen et al. | |
| 6,790,275 B2 | 9/2004 | Macklin et al. | |
| 6,906,164 B2 | 6/2005 | DeBruin | |
| 6,910,796 B2 * | 6/2005 | Bailey et al. | 366/40 |
| 6,923,565 B2 * | 8/2005 | Johnson | 366/2 |
| 7,267,473 B2 * | 9/2007 | Kreutzer | 366/10 |
| 7,464,757 B2 * | 12/2008 | Pessin et al. | 166/285 |
| 7,516,909 B2 * | 4/2009 | Kaligian et al. | 239/432 |
| 7,620,481 B2 * | 11/2009 | Dykstra | 700/285 |
| 2002/0093875 A1 * | 7/2002 | Rondeau et al. | 366/8 |
| 2004/0156908 A1 * | 8/2004 | Polaschegg | 424/486 |
| 2005/0087135 A1 | 4/2005 | Hioki et al. | |
| 2005/0272891 A1 | 12/2005 | Fouarge et al. | |
| 2005/0276152 A1 * | 12/2005 | Goode et al. | 366/6 |
| 2007/0189108 A1 * | 8/2007 | Lindblom et al. | 366/30 |
| 2008/0165612 A1 * | 7/2008 | Dykstra | 366/8 |
| 2008/0316856 A1 * | 12/2008 | Cooley et al. | 366/142 |
| 2009/0316515 A1 * | 12/2009 | Morey et al. | 366/8 |

FOREIGN PATENT DOCUMENTS

| | | | | |
|---|---|---|---|---|
| DE | 3544140 A1 * | 6/1987 | | |
| EP | 394785 A1 * | 10/1990 | | B28C 7/00 |
| GB | 2350434 A * | 3/2000 | | |
| WO | WO 03027038 A1 | 4/2003 | | |

OTHER PUBLICATIONS

Communication from the Canadian Patent Office mailed Oct. 12, 2010 for the counterpart Canadian patent application to U.S. Appl. No. 11/906,210.

* cited by examiner

METHOD AND DEVICE FOR DISPENSING LIQUIDS

CROSS REFERENCE TO RELATED APPLICATIONS

This application claims the benefit of the filing date, under 35 U.S.C §119(e) of U.S. Provisional Application For Patent Ser. No. 60/923,235, filed Apr. 13, 2007, which is hereby incorporated by reference in its entirety.

TECHNICAL FIELD

Provided is a method and device for dispensing liquids. The method and device precisely and accurately dispenses a desired quantity of one or more additive liquids either simultaneously, in a desired sequence, or a combination of both for use with a cementitious mixture.

BACKGROUND

Cementitious mixtures comprise mixtures of hydraulic cement and water. Hydraulic cements may be mixed with water and small aggregate to form mortars, a cementitious mixture. Concrete, a cementitious mixture, is a mortar which additionally includes large aggregate. Cementitious mixtures include a wide and increasing variety of components. Such components include, but are not limited to, hydraulic cement, pozzolans, fillers, water, coarse and fine aggregate, and chemical additives and admixtures. Chemical additives, admixtures, and concentrates of chemical admixtures include, but are not limited to, set retarders, set accelerators, air-entraining or air-detraining agents, corrosion inhibitors, any other dispersants for cement, pigment dispersions, wetting agents, water soluble polymers, strength enhancing agents, rheology modifying agents, water repellents, and any other admixture or additive that does not adversely affect the properties of the cementitious mixture. Many chemical additives, admixtures, and concentrates of chemical admixtures are added to a cementitious mixture in liquid form.

As used herein subsequently, the term "additive" will comprise additives, chemical admixtures, and concentrates of chemical admixtures.

Dispensing additive liquids for use with cementitious mixtures requires care in the precision and accuracy of dispensing to ensure that the desired quantity of additive liquid is dispensed for inclusion into a batch of cementitious mixture. Failure to dispense with the requisite precision may result in undesirable variation in cementitious mixture quality and performance between batches. Failure to dispense with the requisite accuracy may result in undesirable cementitious mixture quality of a given batch.

A common method in the industry for addition of additive liquids to cementitious mixtures which achieves acceptable levels of precision and accuracy for determining the quantity of additive liquids is the accumulation and measurement of the additive liquid in the a vessel such as a weigh vessel or a volumetric accumulator. A weigh vessel is a container engaged with a scale by which the vessel or the vessel and contents accumulated therein may be weighed. Scales are well-established technology that permits very high level of precision and accuracy in the determination of the weight of accumulated material. By taking the weight of the vessel with its accumulated contents and subtracting the known weight of the vessel, the weight of the accumulated contents of the vessel may be determined. The weight of the contents may be used to determine the quantity of the contents because, at a constant acceleration, weight is proportional to mass. After weighing the vessel and its contents, the accumulated contents are discharged from the vessel so that they may be incorporated into the cementitious mixture.

A disadvantage of using a weigh vessel is that the simplest way to establish the weight of the additive liquid contents is to accumulate them and allow them to come to rest in the vessel over some repose time prior to weighing the vessel. Failure to allow the accumulated contents to come to rest in the vessel can result in dynamic forces contributing to the measured weight of the contents, and a resultant inaccurate measurement of the quantity of additive liquid. This repose time for the liquid to come to rest adds undesirable time, and therefore cost, to the method of determining the quantity of liquid.

Another disadvantage of using a weigh vessel or any other vessel in which the additive liquid is accumulated and measured is that, due to various physical properties which may include, but are not limited to adhesion, cohesion, viscosity, and apparent viscosity, some of the quantity of an additive liquid weighed in a weigh vessel may remain in the vessel after the weighing operation and discharge of the contents from the vessel. This remaining quantity of additive liquid is part of the additive liquid which was weighed such that, failure to incorporate this remaining quantity of additive liquid into the cementitious mixture may result in unacceptable inaccuracy.

One common way of reducing or eliminating the problem of a remaining quantity of additive liquid in the weigh vessel is by flushing at least a portion of the remaining quantity of additive liquid from the weigh vessel with a purgative fluid. Subsequently, the purgative fluid and the flushed portion of the remaining quantity of additive liquid is incorporated into the cementitious mixture. By so doing, the quantity of liquid remaining in the weigh vessel is reduced to levels which do not introduce unacceptable inaccuracy into the method.

A disadvantage of flushing the remaining quantity of additive liquid from the weigh vessel with a purgative fluid is that, in order to assure precision in the method, it is necessary to flush all or substantially all of the entire volume of the weigh vessel in order to assure that all or at least a substantial fraction of the remaining quantity of additive liquid is flushed therefrom. In order to flush all or substantially all of the entire volume of the weigh vessel, it is necessary to fill or substantially fill the entire volume of the weigh vessel with the purgative fluid. Cementitious mixture batches greatly vary in volume and can be quite large. The volumes of additive liquids for use in large cementitious mixtures vary in volume proportionately to the cementitious mixture batch volume and can also be proportionately large. Accordingly, a weigh vessel for commercial and industrial applications must be of sufficient size to accommodate the maximum volume of liquid to be weighed. Because this maximum volume of additive liquid to be weighed is proportionately large, the amount of purgative fluid required to fill or substantially fill the entire volume of the weigh vessel is also proportionately large. Filling or substantially filling the weigh vessel with purgative fluid can be costly both in time to fill and in the cost of the purgative fluid. An alternative is to maintain a smaller volume weigh vessel and resort to multiple additions of additive liquid. While this allows for a smaller weigh vessel to be employed, it is more time consuming and undesirably increases the time to measure and discharge the desired amount of additive liquid.

Because the volume of purgative fluid may be large and may be incorporated into the cementitious mixture, it is important to use a purgative fluid that will not adversely affect the properties of the mixture at high volumes. Because water is the most common purgative fluid, and because extraneous water in a cementitious mixture has strong adverse affects on the strength and rheological properties of the cementitious product, preventing the addition of extra water in the form of the purgative fluid is important to product quality. It is common to reduce the volume of water added to the cementitious mixture prior to incorporation of the additive or additives by a volume of water equal to the volume of the purgative water needed to flush the weigh vessel. This reduction in volume of water is referred to as "hold-back" water because it is held back from the cementitious mixture. By so doing, upon addition of the purgative water, the amount of water in the cementitious mixture reaches the desired amount.

A drawback of using a method in which the volume of water in the cementitious mixture is regulated by using hold-back water, is that the smallest batch of cementitious mixture which can be produced with the proper quantity of water ("minimum batch volume") corresponds to one having exactly the volume of the hold-back water. Because the volume of the hold-back water is equal to the volume of the purgative fluid needed to flush the weigh vessel and because the weigh vessel is relatively large for commercial and industrial applications, the minimum batch volume is correspondingly large. This minimum batch volume limits the size of cementitious mixture batches and delays the point at which the cementitious mixture can be mixed, thereby limiting the utility of a given weigh vessel.

The state of the art methods for dispensing liquid additives to cementitious mixtures are slow, costly, and create an undesired lower limit to the cementitious mixture batch volume. Accordingly, a need exists in the art for an improved device and method for dispensing additive liquids for addition to cementitious mixtures.

SUMMARY

Provided is a method of dispensing a user-defined quantity of one or more liquids to a cementitious mixture comprising moving an additive liquid to a manifold; moving said additive liquid from said manifold to a flow meter; measuring the quantity of said additive liquid while said additive liquid is moving through said flow meter: moving said additive liquid from said flow meter to a cementitious mixture; optionally, repeating the above steps for one or more additional additive liquids; and purging at least one of said manifold and said flow meter with a purgative fluid.

Further provided is a device for dispensing liquids comprising an additive liquid supply; a purgative liquid supply; a manifold comprising a plurality of inputs, a How path in fluid communication with each of said plurality of inputs, and an output in fluid communication with each of said flow paths, wherein output is substantially equidistant from each of said plurality of inputs and wherein said flow paths comprise a substantially same volume: and a flow meter in fluid communication with said manifold capable of measuring the mass of said additive liquid while said additive liquid is moving through said flow meter.

DETAILED DESCRIPTION

Provided is a method and a dispensing device for sequentially dispensing a user-determined quantity of one or more additive liquids to a cementitious mixture. The dispensing device generally comprises one or more additive liquid supplies, one or more pumps, at least one purgative fluid supply, a manifold, and a flow meter. The dispensing device may optionally further comprise diversion components.

As used herein, the term cement refers to any hydraulic cement. Hydraulic cements are materials that set and harden in the presence of water. Suitable non-limiting examples of hydraulic cements include Portland cement, masonry cement, alumina cement, refractory cement, magnesia cements, such as a magnesium phosphate cement, a magnesium potassium phosphate cement, calcium aluminate cement, calcium sulfoaluminate cement, calcium sulfate hemi-hydrate cement, oil well cement, ground granulated blast furnace slag, natural cement, hydraulic hydrated lime, and mixtures thereof. Portland cement, as used in the trade, means a hydraulic cement produced by pulverizing clinker, comprising of hydraulic calcium silicates, calcium aluminates, and calcium ferroaluminates, with one or more of the forms of calcium sulfate as an interground addition. Portland cements according to ASTM C150 are classified as types I, II, III, IV, or V. As used herein, the term cementitious mixture refers to any mixture comprising cement and water.

Cement admixture or additives include accelerators, retarders, air-entraining agents, air detraining agents, corrosion inhibitors, pigment dispersions, wetting agents, water soluble polymers, water repellants, water-reducing admixtures, superplasticizers, dampproofing admixtures, gas formers, permeability reducers, pumping aids, fungicides, germicides, insecticides, bonding admixtures, strength enhancing agents, shrinkage reducing agents, dispersants and mixtures thereof.

The term dispersant as used throughout this specification includes, among others, polycarboxylate dispersants, with or without polyether units. The term dispersant is also meant to include those chemicals that also function as a plasticizer, water reducers, high range water reducers, fluidizer, antiflocculating agent, or superplasticizer for cementitious compositions, such as lignosulfonates (calcium lignosulfonates, sodium lignosulfonates and the like), salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins, for example, LOMAR D® dispersant (Cognis Inc., Cincinnati, Ohio), polyaspartates, oligomeric dispersants, any other chemical that functions as a dispersant or water reducer or superplasticizer for cement, and mixtures thereof.

Polycarboxylate dispersants may include but are not limited to dispersants or water reducers sold under the trademarks GLENIUM® 3030NS, GLENIUM® 3200 HES, GLENIUM® 3400 NV, GLENIUM 3000NS® (BASF Admixtures Inc., Cleveland, Ohio), ADVA® (W. R. Grace Inc., Cambridge, Mass.), VISCOCRETE® (Sika, Zurich, Switzerland), and SUPERFLUX® (Axim Concrete Technologies Inc., Middlebranch, Ohio).

The term oligomeric dispersant refers to oligomers that are a reaction product of: component A. optionally component B, and component C; wherein each component A is independently a nondegradable, functional moiety; wherein component B is an optional moiety, where if present, each component B is independently a nondegradable moiety that is disposed between the component A moiety and the component C moiety; and wherein component C is at least one moiety that is a linear or branched water soluble, nonionic polymer. Oligomeric dispersants are disclosed in U.S. Pat. Nos. 6,133,347, 6,492,461, and 6,451,881, which are hereby incorporated by reference, as if fully written out below.

The term polyaspartate dispersant refers to a polymer dispersant comprising a functionalized, hydrophilic, oligomeric or polymeric, side chain substituted polyimide or polyamide main chain polymer. The side chains may include linking amides, esters, and thioesters. The polyaspartate dispersant is water soluble and may be substantially non-crosslinked. Illustative polyaspartate dispersants are disclosed in U.S. Pat. Nos. 6,136,950, and 6,284,867, 6,429,266, which are hereby incorporated by reference, as if fully written out below.

The term air entrainer includes any chemical that will entrain air in cementitious compositions. Air entrainers can also reduce the surface tension of a composition at low concentration. Air-entraining admixtures are used to purposely entrain microscopic air bubbles into concrete. Air-entrainment dramatically improves the durability of concrete exposed to moisture during cycles of freezing and thawing. In addition, entrained air greatly improves a concrete's resistance to surface scaling caused by chemical deicers. Air entrainment also increases the workability of fresh concrete while eliminating or reducing segregation and bleeding. Materials used to achieve these desired effects can be selected from salts of wood resin; (Vinsol resin); some synthetic detergents; salts of sulfonated lignin; salts of petroleum acids; salts of proteinaceous material; fatty and resinous acids and their salts; alkylbenzene sulfonates; and salts of sulfonated hydrocarbons. Air entrainers are added in an amount to yield a desired level of air in a cementitious composition.

Retarders, set retarders, are used to retard, delay, or slow the rate of setting of concrete. They can be added to the concrete mix upon initial batching or sometime after the hydration process has begun. Retarders are used to offset the accelerating effect of hot weather on the setting of concrete, or delay the initial set of concrete or grout when difficult conditions of placement occur, or problems of delivery to the job site, or to allow time for special finishing processes or to aid in the reclamation of concrete left over at the end of the work day. Most retarders also act as water reducers and can also be used to entrain some air into concrete. Lignosulfonates, hydroxylated carboxylic acids, lignin, borax, gluconic, tartaric and other organic acids and their corresponding salts, phosphonates, certain carbohydrates and mixtures thereof can be used as retarding admixtures.

Air detrainers are used to decrease the air content in the mixture of concrete. Tributyl phosphate, dibutyl phthalate, octyl alcohol, water-insoluble esters of carbonic and boric acid, and silicones are some of the common materials that can be used to achieve this effect.

Bonding admixtures are usually added to Portland cement mixtures to increase the bond strength between old and new concrete and include organic materials such as rubber, polyvinyl chloride, polyvinyl acetate, acrylics, styrene butadiene copolymers, and other powdered polymers.

Water-reducing admixtures are used to reduce the amount of mixing water required to produce concrete of a certain slump, to reduce the ratio of water and cement, or to increase slump. Typically, water reducers will reduce the water content of the concrete mixture by approximately up to 15%.

Superplasticizers are high-range water reducers, or water-reducing admixtures. They are added to concrete to make high-slump, flowing concrete, and thus reduce the water-cement ratio. These admixtures produce large water reduction or great flowability without causing undue set retardation or entrainment of air in mortar or concrete. Among the materials that can be used as superplasticizers are sulfonated melamine formaldehyde condensates, sulfonated naphthalene formaldehyde condensates, certain organic acids, lignosulfonates, and/or blends thereof.

Natural and synthetic admixtures are used to color concrete for aesthetic and safety reasons. These coloring admixtures comprise pigments and pigment dispersions and include carbon black, iron oxide, phthalocyanine, umber, chromium oxide, titanium oxide and cobalt blue.

Corrosion inhibitors in concrete serve to protect embedded reinforcing steel from corrosion due to its highly alkaline nature. The high alkaline nature of the concrete causes a passive and noncorroding protective oxide film to form on the steel. However, carbonation or the presence of chloride ions from deicers or seawater can destroy or penetrate the film and result in corrosion. Corrosion-inhibiting admixtures chemically arrest this corrosion reaction. The materials most commonly used to inhibit corrosion are calcium nitrite, sodium nitrite, sodium benzoate, certain phosphates or fluorosilicates, fluoroaluminates, amines, organic based water repelling agents, and related chemicals.

Dampproofing admixtures reduce the permeability of concrete that have low cement contents, high water-cement ratios, or a deficiency of fines in the aggregate. These admixtures retard moisture penetration into dry concrete and include certain soaps, stearates, and petroleum products.

Grouting agents, such as air-entraining admixtures, accelerators, retarders, and non-shrink and workability agents, adjust grout properties to achieve a desired result for specific applications. For example, Portland cement grouts are used for a variety of different purposes, each of which may require a different agent to stabilize foundations, set machine bases, fill cracks and joints in concrete work, cement oil wells, fill cores of masonry walls, and grout pre-stressing tendons and anchor bolts, and fill the voids in pre-placed aggregate concrete.

Gas formers, or gas-forming agents, are sometimes added to concrete and grout in very small quantities to cause a slight expansion prior to hardening. The amount of expansion is dependent upon the amount of gas-forming material used and the temperature of the fresh mixture. Aluminum powder, resin soap and vegetable or animal glue, saponin or hydrolyzed protein can be used as gas formers.

Permeability reducers are used to reduce the rate at which water under pressure is transmitted through concrete. Silica fume, fly ash, ground slag, natural pozzolans, water reducers, and latex can be employed to decrease the permeability of the concrete. Pozzolan is a siliceous or siliceous and aluminous material, which in itself possesses little or no cementitious value. However, in finely divided form and in the presence of moisture, pozzolan will chemically react with calcium hydroxide at ordinary temperatures to form compounds possessing cementitious properties.

Pumping aids are added to concrete mixes to improve pumpability. These admixtures thicken the fluid concrete, i.e., increase its viscosity, to reduce de-watering of the paste while it is under pressure from the pump. Among the materials used as pumping aids in concrete are organic and synthetic polymers, hydroxyethylcellulose (HEC) or HEC blended with dispersants, organic flocculents, organic emulsions of paraffin, coal tar, asphalt, acrylics, bentonite and pyrogenic silicas, natural pozzolans, fly ash and hydrated lime.

Additive liquids are those additives in liquid form which the dispensing device measures and dispenses. For purposes of illustration and without limitation, additive liquids comprise liquids composed of a single compound, solutions, suspensions, dispersions, emulsions, slurries, slushes, or combinations thereof.

Without limitation, in certain embodiments the additive liquids are subject to separation. Additive liquids may be Newtonian or non-Newtonian. Without limitation, non-Newtonian liquids may comprise power-law fluids, thixotropic or rheopectic liquids which have properties which depend on the time or rate of application of strain to the liquid. In certain embodiments, it is desirable to subject additive liquids to a period of flow prior to dispensing in order to agitate the liquid to promote homogeneity or to subject the liquid to a certain time or rate of strain. In certain embodiments, the additive liquid comprises an iron oxide based thixotropic pigment dispersion. Without limitation, in certain embodiments, thixotropic pigment dispersion additives are subjected to a period of recirculating flow prior to dispensing to promote homogeneity of the pigment dispersion or to lower the apparent viscosity of the pigment dispersion, or both.

An additive liquid supply comprises a storage volume for storing an additive liquid. The additive liquid supply may comprise any volume which may accumulate a volume of the additive liquid. By way of illustration, but not limitation, the additive liquid supply may be selected from drums, tanks, vats, bladders, accumulators, vessels, and combinations thereof.

According to certain embodiments, the method and device use a pump. A pump is any device which adds head to a fluid. The resultant head may be in the form of higher velocity flow, higher pressure flow, greater height of fluid flow, or any combination thereof. Without limitation, in certain embodiments a pump may comprise an air diaphragm pump, an axial flow pump, or a centrifugal pump.

Figure 4:
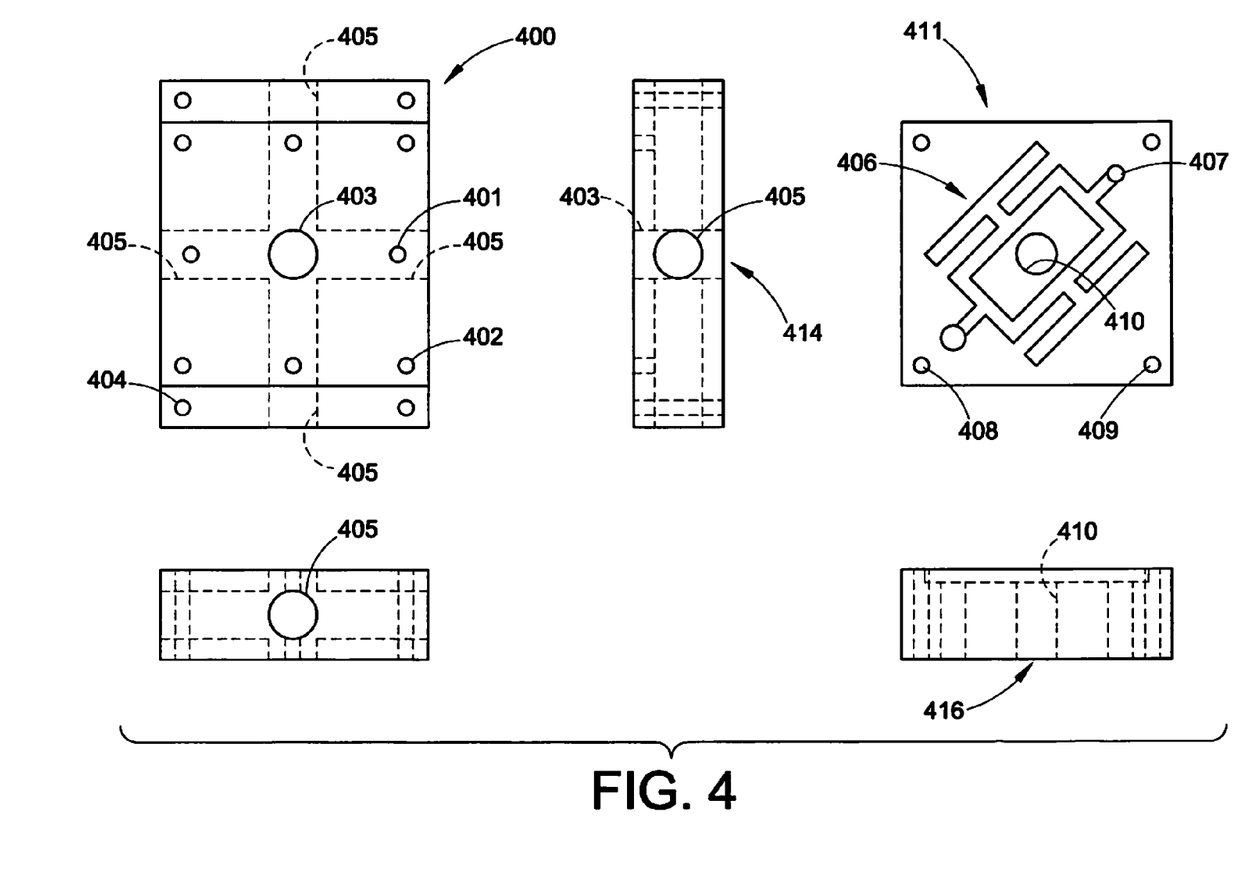
FIG. 4 is a series of orthographic projections illustrating an embodiment of a manifold.

The method and device also incorporate a manifold into which the additive liquids and purgative fluids are moved. A manifold is a type of fluid handling device comprising a plurality of ports, in which at least some of the ports are flowably engaged to one another by flow-paths. A port is an opening in the manifold which allows fluid to be input to or output from the manifold. The simplest manifold is a tube; a single input port flowably engaged to a single output port by a single flow-path. Utility of a manifold comprises routing one or more input fluids to one or more output ports, outputting fluid to one or more ports, and/or mixing fluid input from a plurality of ports. The manifold can route one or more additive liquids, or one or more purgative fluids, or a mixture of a purgative fluid and an additive liquid to the output port. Without limitation, the dispensing device uses a manifold having a plurality of input ports and a single output port. FIG. 4 shows a series of orthogonal projections of one illustrative embodiment of a manifold. The manifold can be composed of materials selected based on the fluids which the manifold will carry. Without limitation, the manifold may be composed of materials selected from the group consisting of aluminum, aluminum alloys, copper, copper alloys, bronze alloys, iron, steel, stainless steel, and combinations thereof. A manifold may comprise a single unitary body or a body comprising a plurality of parts. The method of forming the manifold or the parts of the manifold may be selected from the group consisting of casting, machining, stamping, rolling, pressing, forging, and cutting. Where the manifold body comprises a plurality of parts, methods for joining the parts may comprise welding, bolting, sintering, and gluing.

The method and device incorporates the use of a flow meter to measure the quantity of the additive liquid to be dispensed into a cementitious mixture. A flow meter is a device which can measure the flow rate of a fluid passing therethrough. Flow meters commonly measure the flow rate of the fluid passing therethrough either as the volumetric flow of fluid passing therethrough or as the mass flow of fluid passing therethrough. These data can be used to calculate a measurement of quantity, as either mass or volume, of the fluid which has passed through the meter. In certain embodiments this calculation of the mass or volume of the fluid which has passed through the meter is carried out by the meter itself. In certain embodiments the calculation of the mass or volume of the fluid which has passed through the meter is carried out by a computer, which integrates the rate of flow data received from the meter with respect to flow time taken from a chronometer or clock. Without limitation, in certain embodiments, the flow meter may also measure, density, temperature, or specific gravity of a fluid passing therethrough. Some flow meters are dependent upon the viscosity of the material flowing through the meter. Flow meters which do not rely upon the viscosity of the material flowing through the meter for measurement purposes include, but are not limited to, electromagnetic, Doppler ultrasonic, time-of-travel ultrasonic, Coriolis mass, and thermal mass flow meters. Certain flow meters do not rely upon the conductivity or the density of the material flowing through the meter for measurement purposes. A Coriolis mass flow meter does not rely upon viscosity or density or conductivity of the material flowing through the meter for measurement purposes. A Coriolis mass flow meter is able to measure materials of diverse properties without the need for prior calibration of the meter to any particular material property in order to accurately and precisely measure material flowing through the meter. Without limitation, in certain embodiments, the flow meter comprises a Coriolis mass flow meter. Without limitation, a serviceable flow meter is available from KROHNE, Inc., 7 Dearborn Road. Peabody, Mass. 01960 of the type OPTIMASS 7000 Series, Model T-15.

Purgative fluid is a fluid which is used to flush at least a portion of any other remaining fluid from the manifold and flow meter. As used herein, the term "purgative fluid" comprises liquids, gases, and combinations thereof. Purgative liquid may be used to flush at least a portion of any additive liquid or purgative gas from the manifold and flow meter. Purgative gas may be used to flush at least a portion of any additive liquid or purgative liquid from the manifold and flow meter. Without limitation, in certain embodiments, the purgative fluid may comprise water or water-based solutions. In certain embodiments a second purgative fluid is available. Without limitation, in certain embodiments in which a second purgative fluid is available, the second purgative fluid comprises a gas selected from air, nitrogen, carbon dioxide, a Nobel gas, and combinations thereof. In certain embodiments utilizing more than one purgative fluid, the dispensing device may include a separate purgative fluid supply for each purgative fluid.

A purgative fluid supply comprises a storage volume for storing purgative fluid. The purgative fluid may be stored in any suitable storage volume in fluid communication with the manifold. A purgative fluid supply may comprise any volume which may accumulate a volume of the purgative fluid. In certain embodiments, without limitation, the purgative fluid supply is selected from drums, tanks, vats, bladders, accumulators, vessels, and combinations thereof.

In certain embodiments, the quantity of purgative fluid used to flush the manifold and flow meter is a user-determined quantity. The quantity of purgative fluid may be measured by means comprising the flow meter, a weigh vessel, or a container of known volume. Without intending to be limited to any particular theory, it is hypothesized that supplying the purgative fluid under flow conditions which result in a high Reynolds number produces more efficient flushing action. Flow conditions which result in a higher Reynolds number comprise higher fluid flow velocity. Input conditions which produce higher fluid flow velocity comprise higher pressure input. In certain embodiments, the purgative fluid is input at high pressure or high velocity or both.

In certain embodiments, the purgative fluid supply is flowably connected to the manifold at locations substantially proximal to the input ducts such that the path of flow of purgative fluid input to any given flow-path substantially coincides with the path of flow of the input additive liquid connected to the input duct of that flow-path. In certain embodiments of the manifold, each of the flow-paths may be of substantially similar geometry and are flowably connected to at least one common purgative fluid supply at a substantially similar location along each flow-path. In certain embodiments, each of the input ports are flowably engaged to the output port by a flow-path wherein all said flow-paths may be of substantially equal length. In certain embodiments, each of the input ports is flowably engaged to the output port by a flow-path wherein all said flow-paths are of substantially similar volume. In certain embodiments wherein said flow-paths are of substantially similar volume and are of substantially equal length, said flow-paths are of substantially constant and substantially equal cross-sectional area. In embodiments in which the flow-paths are of substantially similar volume and in which each of the flow-paths are flowably connected to a common purgative fluid supply at a substantially similar location along each flow-path, purgative fluid input from the common purgative fluid supply will purge each flow-path substantially simultaneously and will be output from the manifold substantially simultaneously.

The purgative fluid may be metered in the same way that the additive liquid is metered, through the flow meter, or by other means as noted above. Because the volume of the manifold and the downstream components need not include any variable volume components, in some embodiments a fixed quantity of purgative fluid may be employed to flush the manifold and the downstream components. In certain embodiments employing a fixed quantity of purgative fluid, metering is not required, purgative fluid may be supplied from an accumulator. In certain embodiments in which purgative fluid is supplied from an accumulator, the accumulator is filled contemporaneously with the metering of additive liquid. In embodiments in which the accumulator is filled contemporaneously with the metering of additive liquid, the filling operation does not add time to the dispensing operation. At the completion of dispensing the additive liquid, the purgative fluid contained within the purgative fluid accumulator may be discharged under pressure or by gravity feed into the manifold whereby flushing would be accomplished as previously described.

A disadvantage of a manifold construction having multiple flow-paths of substantially dissimilar volume, is that the additive liquid which is supplied to the most voluminous flow-path would leave the largest quantity of residual material. As the flow-path volume decreases, the respective quantity of residual additive liquid from each flow-path decreases. In certain embodiments of the manifold all of the flow-paths are of the same or the substantially same small volume with input ports equidistant from the manifold output. In this equidistant-type manifold, the amount of remaining additive liquid in the manifold is reduced by minimizing the volume of the input channels and that the quantity of remaining additive liquid averaged across all input ports, can be reduced. In this equidistant-type manifold, it is also advantageous to simultaneously deliver purgative fluid to all input ports so as to assure that a sufficiently large quantity of the remaining additive liquid is flushed from the manifold. A further advantage includes minimizing the path length between the manifold and the mass flow meter. As the path length and the subsequent volume of the duct flowably engaging the manifold and flow meter is kept small, the volume of purgative fluid required to sufficiently remove remaining additive liquid from the manifold, duct flowably engaging the manifold and flow meter, and the flow meter is reduced and the subsequent time required to provide said sufficient amount of purgative fluid is reduced. This type of manifold construction effectively limits the amount of residual of any one additive liquid remaining in the manifold flow paths.

The method and device may also incorporate diversion components to allow input fluids to be routed through an output elected amongst a plurality of possible outputs. Diversion components may comprise a diversion valve or a diversion assembly.

A diversion valve allows input fluids to be routed through one or more of a plurality outputs. In certain embodiments a diversion valve comprises a multi-port ball valve. Without limitation, in certain embodiments a diversion valve is three-position air-operated solenoid valve, which routes a liquid from one input to a user-selectable one of two or more available outputs.

A diversion assembly may comprise one or more valves and a manifold further comprising two or more outputs. In certain embodiments, a manifold having one input and two outputs has a standard single-input, single-output valve controlling flow for each output and thereby allows input fluids to be routed through either or both outputs.

In certain embodiments, a diversion assembly is engaged to receive additive liquid from the pump and to output liquid to either an output in fluid communication with the manifold or to an output in fluid communication with the additive liquid supply or both. When outputting liquid to the additive liquid supply, the diversion assembly is in recirculation mode in which the flow path comprises the additive liquid supply, the pump, and the diversion assembly. When outputting liquid to the manifold, the diversion assembly is in dispense mode in which the flow path comprises the additive liquid supply, the pump, the diversion assembly, the manifold, and the flow meter.

In certain embodiments, flow from the flow meter is output to an output duct or conveying vessel or both which convey at least a portion of the output flow, directly or indirectly, to the cementitious mixture. Alternatively, the flow from the flow meter is output directly to the cementitious mixture.

The dispensing method and device will be described with respect to the illustrative embodiments shown in FIGS. 1-4. It should be noted that the embodiments show in FIGS. 1-4 are intended to be merely illustrative and should not be considered to limit the dispensing method and device in any manner.

Figures 1, 2:
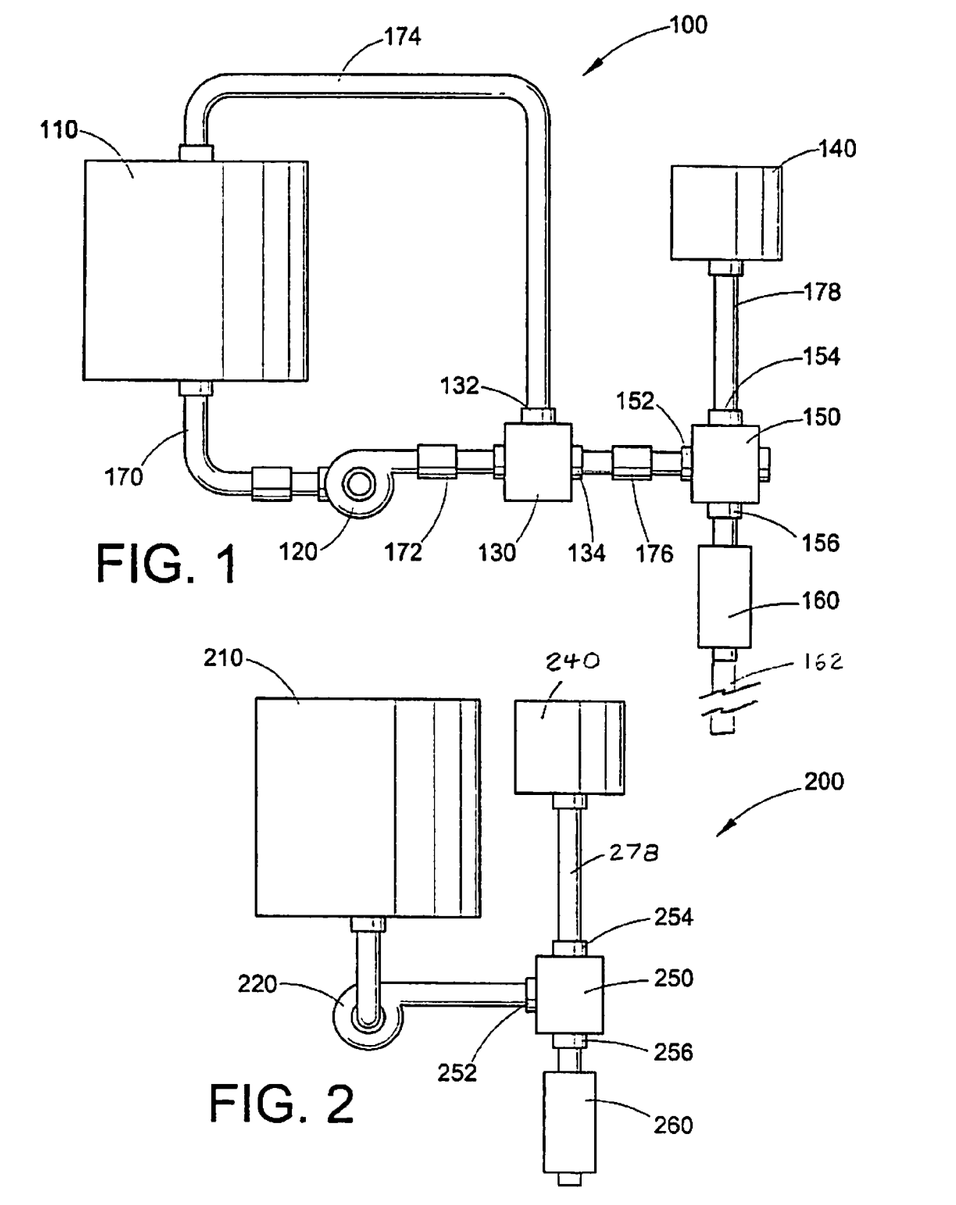
FIG. 1 is a schematic view illustrating one embodiment of an apparatus for dispensing liquids.
FIG. 2 is a schematic view illustrating another embodiment of an apparatus for dispensing liquids.

FIG. 1, illustrates a dispensing apparatus 100 comprising an additive liquid supply 110, a pump 120, a diversion assembly 130, a purgative fluid supply 140, a manifold 150, and a flow meter 160. In the embodiment illustrated in FIG. 1, the additive liquid supply 110 is in fluid communication with duct 170. Duct 170 is in fluid communication with additive liquid supply 110 and pump 120. According to other embodiments, pump 120 may be in direct fluid communication with additive liquid supply 110 eliminating duct 170. Still referring to FIG. 1, pump 120 is in fluid communication with duct 172. Duct 172 is in fluid communication with pump 120 and the diversion component 130. In certain other embodiments, pump 120 may be in direct fluid communication with diversion assembly 130 eliminating duct 172. Diversion component 130 comprises two outputs 132 and 134. Diversion component output 132 is in fluid communication with duct 174. Duct 174 is in fluid communication with diversion component output 132 and additive liquid supply 110. Like all the other ducts, duct 174 can be eliminated in those alternative embodiments in which the components with which it communicates are in direct fluid communication with one another. Diversion component output 134 is in fluid communication with duct 176. Duct 176 is in fluid communication with diversion component output 134 and additive liquid input 152. Duct 176 can be eliminated in those alternative embodiments in which the components with which it communicates are in direct fluid communication with one another. Additive liquid input 152 flowably engages manifold 150. Manifold 150 comprises an additive liquid input 152, a purgative fluid input 154, and output 156. The purgative fluid input 152 flowably engages duct 178. Duct 178 flowably engages and creates a flowable connection between purgative fluid input 154 and purgative fluid supply 140. As noted above, duct 178 can be eliminated in those alternative embodiments in which the components with which it communicates are in direct fluid communication with one another. Output 156 of manifold 150 is in fluid communication with flow meter 160. Optionally, a duct 162 may be in fluid communication with the output of flow meter 160.

In operation, the diversion assembly 130 may be set to move additive liquid to output 132 or output 134 or both. Without limitation, in embodiments including additive liquids having properties dependant upon flow, such as thixotropic liquids or liquids which settle or separate when static, it is desireable to establish flow of these fluids for a preliminary period of time prior to beginning dispensing of these liquids from output 134 to manifold inlet 152. Where it is desireable to establish flow for a preliminary period of time prior to beginning dispensing, the diversion assembly is initially set to output 132. Once the diversion assembly is set to output 132, the pump 120 is activated to move liquid from the additive liquid supply 110 to the diversion assembly 130. When the diversion assembly 130 is set to output 132, the pump is activated and additive liquid moved to the diversion assembly 130 is returned to the additive liquid supply 110 of instead of being moved to manifold 150. Without limitation, in certain alternative embodiments, output from 132 may be routed to drain or otherwise disposed. It is not always desirable or necessary to establish flow of a fluid for a preliminary period of time prior to beginning dispensing. If it is not desireable to establish flow for a preliminary period of time prior to beginning dispensing or once the preliminary period has elapsed, the diversion assembly 130 is set to output 134. Once the diversion assembly 130 is set to output 134, the pump 120 remains active and additive liquid is moved from the additive liquid supply 110 to the diversion assembly 130. When the diversion assembly 130 is set to output 134, the additive liquid moved to the diversion assembly 130 is subsequently moved to the manifold 150. Additive liquid moved to the manifold 150, flows through the manifold 150, out of the manifold 150 through output port 156, and into the flow meter 160 where the quantity of the additive liquid is measured, is dispensed from the flow meter 160, and is either directly introduced into a cementitious mixture or flows into duct 162 is introduced into a temporary holding vessel to be subsequently transferred into a cementitious mixture. In embodiments where duct 162 exists, flow from the meter 160 flows into duct 162 and from there into a cementitious mixture or from there to a temporary holding vessel to be subsequently transferred into a cementitious mixture.

The flow meter 160 is capable of precise and accurate measurement of the quantity of additive liquid passing through the meter. The flow meter 160 is capable of maintaining a very high level of precision and accuracy in its measurements while the liquid being measured is flowing, even at very high flow rates. As a result of the capability to take measurements while the additive liquid is flowing, over a period of time, the flow meter 160 can measure the mass or volume of a volume liquid greater than the volume of the flow meter 160. For a given meter, the volume of the flow meter 160 is fixed. The volume of liquid measured is a function of and is the product of: 1) the volumetric flow rate of the additive liquid, and 2) the time of flow. As a result of the capability of the flow meter 160 to maintain a very high level of precision and accuracy in its measurements while the additive liquid being measured is flowing at very high volumetric flow rates, the volumetric flow rate of the additive liquid can be large. By making time of flow large or volumetric flow rate of the additive liquid large, or both large, the volume of the additive liquid measured can be very high and much larger than the volume of the flow meter 160. Because the volume of liquid measured is not a function of the volume of the flow meter 160 and is not a function of the volume of the manifold 150, the volume of the flow meter 160 and the volume of the manifold 150 can be kept small while still permitting movement and measurement of a very large volume of liquid in a short time. In embodiments in which the volume of the flow meter 160 and the volume of the manifold 150 are small, these components require a small quantity of purgative fluid to be completely filled for flushing purposes. In embodiments in which the volume of the flow meter 160 and the volume of the manifold 150 are small, the small quantity of purgative fluid needed for flushing purposes does not create an important minimum batch volume limitation. Thus, the volumetric flow rate of the additive liquid, time of flow of additive liquid, flow meter 160 volume, and manifold 150 volume may be selected, by which a very large volume of liquid can be accurately and precisely massed in a short time without creating an important minimum batch volume limitation.

In certain embodiments, operation of the additive liquid dispensing apparatus is controlled by a computer. In such embodiments, the user-desired control criteria are input to a computer controller. These user-desired control criteria may include but are not limited to the type of liquids to be dispensed, the length of time of any preliminary flow period for any liquids, the order in which liquids will be dispensed; the amount of each liquid to be dispensed, determination of when purging operations will commence, the purgative fluid or fluids to be used in purging operation, the amount of purgative fluid to be used in purging operations, pump speeds, and diversion controls.

For embodiments in which the user-desired control criteria include the amount of each additive liquid to be dispensed, the flow meter will provide a signal indicating the quantity of fluid dispensed. This flow meter signal is checked by the computer controller at some pre-determined or user-determined frequency and is compared to the input user-desired control criteria. When the flow meter signal is equal to or exceeds the user-desired control criteria, the controller stops dispensing of the liquid. Dispensing may be stopped by actions comprising repositioning a valve in an associated diversion component, stopping an associated pump, or both. In certain embodiments, signals may be transmitted by wireless transmission means.

In certain embodiments, the volume of the manifold and the downstream components, comprising the flow meter, any connection duct between the manifold and the flow meter, the flow meter, and any components in fluid connection with the output of the flow meter, are minimized in order to minimize the quantity of purgative fluid needed to flush the manifold and the downstream components. In certain embodiments, the flow meter is directly connected to the manifold and components downstream of the flow meter are eliminated in order to minimize the quantity of purgative fluid needed to flush the manifold and downstream components. In certain embodiments, the capacity of the manifold and downstream components to accumulate fluid is minimized or substantially eliminated in order to minimize the quantity of purgative fluid needed to flush the manifold and downstream components.

After additive liquid dispensing is stopped, purgative fluid is moved from purgative fluid supply 140 to manifold 150. The purgative fluid flushes at least a portion of any remaining additive liquid from manifold 150. The purgative fluid and any flushed remaining additive liquid is moved from manifold 150, through manifold output 156 into the flow meter 160. Again the purgative fluid flushes at least a portion of any remaining additive liquid from the flow meter 160. The purgative fluid and any flushed remaining additive liquid is moved from flow meter 160 and is introduced into a cementitious mixture or a suitable temporary holding vessel.

FIG. 2 illustrates a dispensing apparatus 200 comprising an additive liquid supply 210, a pump 220, a purgative fluid supply 240, a manifold 250, and a flow-meter 260. In the embodiment illustrated in FIG. 2, the additive liquid supply 210 is in fluid communication with pump 220. Pump 220 is in fluid communication with additive liquid input 252. Additive liquid input 252 is in fluid communication with manifold 250. Manifold 250 comprises an additive liquid input 252, a purgative fluid input 254 and output 256. The purgative fluid input 254 is in fluid communication with duct 278. Duct 278 is in fluid communication with purgative fluid input 254 and purgative fluid supply 240. In other embodiments, purgative fluid input 254 is in fluid communication with purgative fluid supply 240 eliminating connecting duct 278. Output 256 is in fluid communication with flow meter 260.

In operation, pump 220 moves additive liquid from the additive liquid supply 210 to additive liquid input 252. Unlike dispensing apparatus 100 shown in FIG. 1, there is no diversion assembly or recirculation loop in dispensing apparatus 200 shown in FIG. 2. Operation of the device depicted in FIG. 2, is otherwise similar to that described above regarding the embodiment illustrated in FIG. 1.

Figure 3:
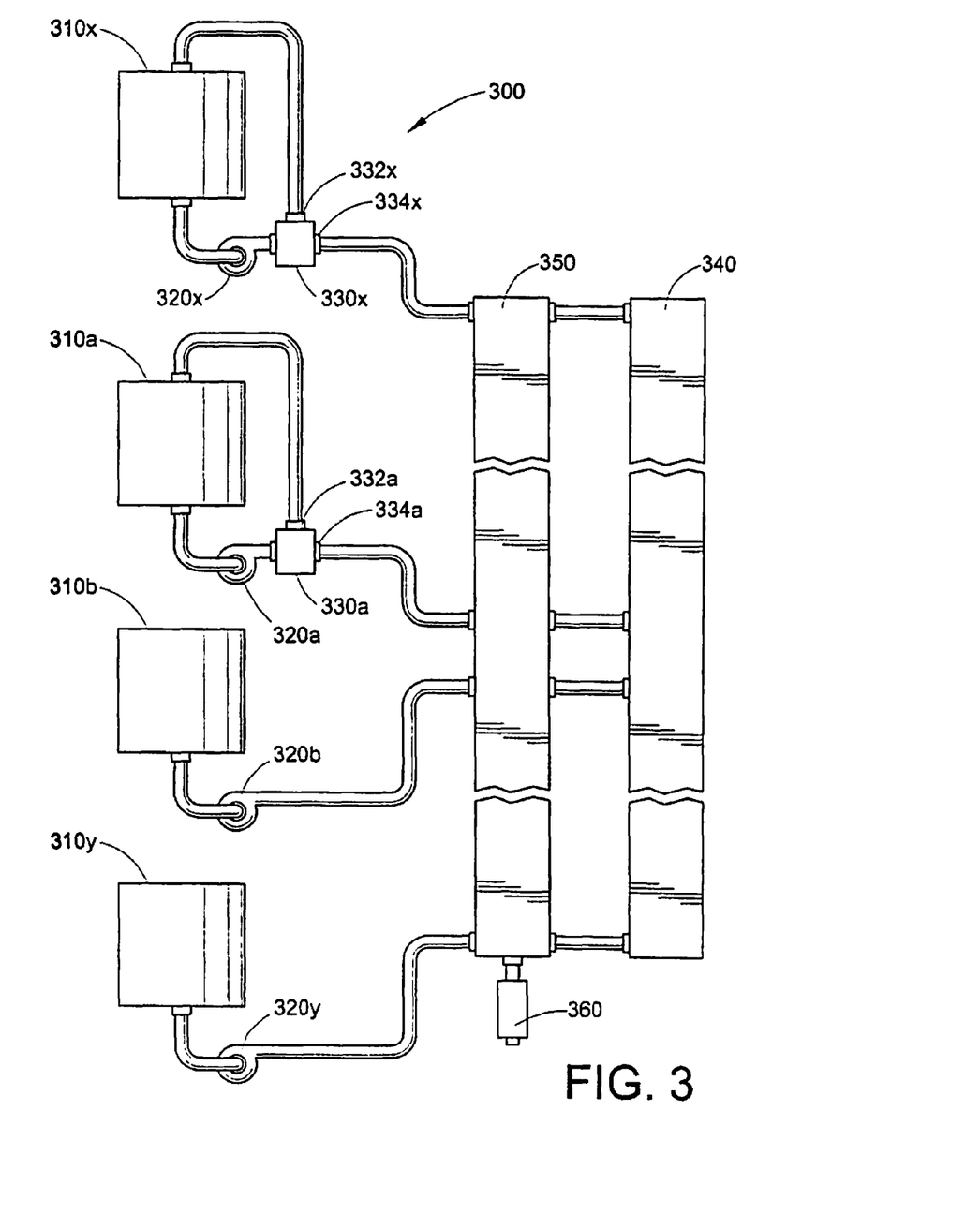
FIG. 3 is a schematic view illustrating another embodiment of an apparatus for dispensing liquids.

FIG. 3 illustrates a dispensing apparatus 300 comprising a plurality of divertable additive liquid sub-assemblies, a plurality of non-divertable additive liquid sub-assemblies, a purgative fluid supply 340, a manifold 350, and a flow meter 360. The components of an arbitrary divertable additive liquid sub-assembly are additive liquid supply $310n$, pump $320n$, diversion assembly $330n$, diversion assembly return output $332n$. and diversion assembly dispense output $334n$ where "n" may be the particular additive liquid divertable sub-assembly identification suffix. For an arbitrary divertable additive liquid sub-assembly, additive liquid supply $310n$ is in fluid communication with pump $320n$. Pump $320n$ is in fluid communication with diversion assembly $330n$. Diversion assembly $330n$ comprises two outputs, diversion assembly return output $332n$, and diversion assembly dispense output $334n$. Diversion assembly return output $332n$ is in fluid communication with additive liquid supply $310n$. Diversion assembly dispense output $334n$ is in fluid communication with manifold 350. The first divertable additive liquid sub-assembly corresponds to identification suffix "a" and comprises additive liquid supply $310a$, pump $320a$, diversion assembly $330a$, diversion assembly return output $332a$, and diversion assembly dispense output $334a$. The last divertable additive liquid sub-assembly corresponds to identification suffix "x" and comprises additive liquid supply $310x$, a first pump $320x$, a first diversion assembly $330x$, diversion assembly output $332x$. and diversion assembly output $334x$. The components of an arbitrary non-divertable additive liquid sub-assembly are additive liquid supply $310m$ and pump $320m$ where "m" may be the particular non-divertable additive liquid sub-assembly identification suffix. For an arbitrary non-divertable additive liquid sub-assembly, additive liquid supply $310n$ is in fluid communication with pump $320n$. Pump $320n$ is in fluid communication with manifold 350. The first non-divertable additive liquid sub-assembly corresponds to identification suffix "b" and comprises additive liquid supply $310b$ and a pump $320b$. The last non-divertable additive liquid sub-assembly corresponds to identification suffix "y" and comprises additive liquid supply $310y$ and a pump $320y$. Manifold 350 is in fluid communication with flow meter 360. The purgative fluid supply 340 is in fluid communication with manifold 350.

In operation, the additive liquid divertable sub-assembly operates similarly to the analogous components described above for FIG. 1. The additive liquid non-divertable sub-assembly operates similarly to the analogous components described above for FIG. 2. While a particular embodiment of the dispensing device may comprise any number of additive liquid divertable sub-assemblies, and any number of additive liquid non-divertable sub-assemblies, every additive liquid sub-assembly need not output its fluid in every particular operation. That is, in certain operations the fluid from only a sub-set of the available additive liquid sub-assemblies is desired such that only certain desired additive liquid sub-assemblies will output their fluid in the desired operation. In certain embodiments, sub-assemblies, divertable or non-divertable, output additive liquid to the manifold 350, one after the other, sequentially. That is, in certain embodiments, no more than one sub-assembly may output fluid to the manifold 350 at any given time such that, in order for the desired number of sub-assemblies to output fluid to the manifold 350, they do so in a sequence. In certain embodiments, the importance of the order of operation depends on the fluids being dispensed.

In certain embodiments, a plurality of sub-assemblies output a plurality of additive liquids to the manifold 350 simultaneously. In embodiments in which a plurality of additive liquids are output to the manifold 350 simultaneously, the liquids will mix (either homogenously or heterogeneously) and move to the flow meter as an additive liquids mixture. In embodiments in which two additive liquids are output to the manifold 350 simultaneously, in which the densities of each of the first and second additive liquids are known, and in which the density of the additive liquid mixture is measured by the flow meter, the mass ratio of each of the first and second additive liquids can be calculated concurrently with the dispensing operation such that a measured quantity of each of the two liquid may be dispensed simultaneously.

In all embodiments, the purgative fluid is dispensed in a manner similar to that described above regarding the embodiment illustrated in FIG. 1. In certain operations, the purgative is dispensed only after all desired additive liquid is output. In certain operations, the purgative is dispensed after each desired additive liquid is output.

FIG. 4 illustrates, in a series of orthographic projections, and without limitation, one embodiment of components of a manifold for a manifold body comprising a plurality of parts. FIG. 4 illustrates a lower housing component 400. The lower housing component 400 is a machined block of material. The material may comprise metal, metal alloys, composite materials, and combinations thereof. Without limitation the material may comprise aluminum, aluminum alloys, copper, copper alloys, bronze alloys, iron, steel, stainless steel, and combinations thereof. The lower housing component 400 comprises a series of apertures 402 for accommodation of a fastener between the lower housing component 400 and the upper housing component 411. The lower housing component 400 also comprises a series of optional apertures 404 for accommodation of a fastener for attachment to a base or foundation (not shown). The lower housing component 400 also comprises a series of ports 405 which allow the input of additive liquid to the manifold. The lower housing component 400 also comprises a port 403 which allows the output of fluid from the lower housing component 400 and, thereby, to the upper housing component 411. The lower housing component 400 also comprises a port 414 which allows the input of fluid to the lower housing component 400 and, thereby, to the upper housing component 411. The lower housing component 400 also comprises a series of ports 401 which allow the input of purgative fluid to the lower housing component 400 and, thereby, to the manifold of which the lower housing component 400 is a part.

FIG. 4 illustrates an upper housing component 411. The upper housing component 411 is a machined block of material. The material may comprise metal, metal alloys, composite materials, and combinations thereof. Without limitation the material may comprise aluminum, aluminum alloys, copper, copper alloys, bronze alloys, iron, steel, stainless steel, and combinations thereof. The upper housing component 411 comprises a series of apertures 409 for accommodation of a fastener between the lower housing component 400 and the upper housing component 411. The upper housing component 411 comprises a series of channels 406 for the routing of one or more purgative fluids. The series of channels 406 communicate with the ports 401 of the lower housing component 400. The upper housing component 411 comprises a port 407 which allows the input of purgative fluid to the upper housing component 411 and, thereby, to the channels 406, and, thereby, to the ports 401 communicating with the channels 406. The upper housing component 411 also comprises a port 408 which allows the input of purgative fluid to the upper housing component 411 and, thereby, to the channels 406, and, thereby, to the ports 401 communicating with the channels 406. The upper housing component 411 also comprises a port 410 which is in communication with port 403. Port 410 allows the input of additive liquid or purgative fluids or both to the upper housing component 411 from communicating port 403. Port 410 is in communication with output port 416. Additive liquid or purgative fluids or both input to the upper housing component 411 through port 410 may be output from the upper housing component 411, and thereby from the manifold of which the upper housing component is a part.

Examples of the method and device for dispensing liquids are set forth below. It should be noted that the following examples merely illustrate the method and device for dispensing liquids, and should not be construed as limiting the claimed method or device in any manner.

The liquid pigment dispersions employed were Chromix™ L iron oxide dispersions from BASF Construction Chemicals, LLC—Admixture Systems (Cleveland, Ohio). The Mass Flow Meter was supplied by Krohne, OPTIMASS, 1300 model. Mortar mixes employed white cement from Federal Cement, and the concrete sand was standard natural occurring sand.

For all samples dispensed through the meter, the accuracy of the mass dispensed is compared to the actual weight dispensed for determination of accuracy and reproducibility. The evaluation of the dispenser involved, as a first step, dispensing a fixed amount of a pigment dispersion followed by dispensing a varied amount of rinse water. The collected mixture of the first pigment and rinse water was discarded. The second step involved dispensing and retaining a fixed amount of a second pigment dispersion along with a fixed mass of rinse water. These steps were conducted to determine the minimum amount of rinse water required to remove a sufficient portion of the first pigment from the manifold and meter so as to maintain the color accuracy of subsequently dispensed pigments and/or combinations of pigments. This second dispensed pigment and rinse water were retained for mixing with white cement in a mortar to highlight any shift in resultant color due to possible residue from the first pigment dispensed.

Measurement of color accuracy is made by dosing an amount of the retained color dispersion to a mortar mixture containing white cement. The amount of color dispersion is selected so as to treat the white cement with approximately 2% of iron oxide pigment. Concrete sand is added to the mix and water to meet a water to cement ratio of 0.47. The mixture is mixed on a KitchenAid® ProLine™ Series model KSM5 mixer with kneading blade for a total time of three minutes with the first 30 seconds at low speed to wet out the mixture followed by high speed mixing for 1.5 minutes. At two minutes, the sides of the mixing vessel are scraped to reconstitute the entire mix and then the mixture mixed at high speed for the remaining minute. After mixing, the green mortar is placed in plastic Petri dishes and allowed to harden for two days. After this period of time the samples are broken in half and the internal color consistency determined visually.

Trial 1: Measurement Accuracy and Estimation of Rinse Water Required.

For Trial 1, the first pigment dispersion employed was Light Red and the second pigment dispersion employed was Yellow. This combination was selected as a result of the high sensitivity of yellow pigmented concrete to shift in color with the addition of small levels of red pigment. Thus, the dispensing unit was instructed to dispense 2 lbs. of Light Red pigment dispersion, followed by a varied amount of rinse water to determine the quantity required to minimize residual pigment in successive colors. In this trial, the amount of rinse water was varied from 16 lbs. to 2 lbs. The accuracy and reproducibility of the dispenser to dispense the proper mass of liquid pigment dispersion was validated and results of the first step for the various rinse water levels are shown in Table 1.

TABLE 1

Dispenser Measurement Accuracy, Trial 1
Red Pigment and Rinse Water

| Mix | Light Red Dispersion Intended (lbs) | Rinse Water Intended (lbs) | Dispersion/Rinse Water Weigh Scale (lbs) | Dispersion/Rinse Water Mass flow Meter (lbs) |
|---|---|---|---|---|
| 1A | 2.00 | 16.00 | 18.00 | 18.01 |
| 1B | 2.00 | 16.00 | 18.00 | 17.94 |
| 2A | 2.00 | 12.00 | 13.85 | 14.02 |

TABLE 1-continued

Dispenser Measurement Accuracy, Trial 1
Red Pigment and Rinse Water

| Mix | Light Red Dispersion Intended (lbs) | Rinse Water Intended (lbs) | Dispersion/Rinse Water Weigh Scale (lbs) | Dispersion/Rinse Water Mass flow Meter (lbs) |
|---|---|---|---|---|
| 2B | 2.00 | 12.00 | 13.95 | 13.98 |
| 3A | 2.00 | 8.00 | 10.10 | 9.98 |
| 3B | 2.00 | 8.00 | 9.95 | 9.99 |
| 4A | 2.00 | 4.00 | 5.75 | 6.03 |
| 4B | 2.00 | 4.00 | 5.50 | 5.94 |
| 5A | 2.00 | 2.00 | 3.75 | 4.01 |
| 5B | 2.00 | 2.00 | 3.50 | 3.97 |

Maximum deviation from intended weight as measured by a weigh scale was 0.15 lbs. for weights above 8 lbs. As would be expected, the accuracy of the dispenser to measure the water after measuring the high specific gravity iron oxide dispersion decreases with the mass of water. The same trend holds for measurement with the mass flow meter, the weigh scale, or comparisons of measurements between the two.

The second step was performed by dispensing 1 lb. of the Yellow pigment dispersion and 16 lbs. of rinse water, the sum of which was retained for determination of the necessary quantity of rinse water for the first pigment to provide acceptable color accuracy. The accuracy and reproducibility of the dispenser to dispense the proper mass of liquid pigment dispersion and rinse water was evaluated and results are shown in Table 2.

TABLE 2

Dispenser Measurement Accuracy, Trial 1
Yellow Pigment and Rinse Water

| Mix | Yellow Dispersion Intended (lbs) | Rinse Water Intended (lbs) | Dispersion/Rinse Water Weigh Scale (lbs) | Dispersion/Rinse Water Mass Flow Meter (lbs) |
|---|---|---|---|---|
| 1A | 1.00 | 16.00 | 17.10 | 17.17 |
| 1B | 1.00 | 16.00 | 17.20 | 17.13 |
| 2A | 1.00 | 16.00 | 17.05 | 17.12 |
| 2B | 1.00 | 16.00 | 17.35 | 17.21 |
| 3A | 1.00 | 16.00 | 17.45 | 17.16 |
| 3B | 1.00 | 16.00 | 16.85 | 17.25 |
| 4A | 1.00 | 16.00 | 17.35 | 17.12 |
| 4B | 1.00 | 16.00 | 17.35 | 17.17 |
| 5A | 1.00 | 16.00 | 17.55 | 17.15 |
| 5B | 1.00 | 16.00 | 17.55 | 17.23 |

Measurement of color accuracy is made by dosing the Yellow pigment dispersion and rinse water mixture at a level that would introduce 1% by weight iron oxide to cement into the mortar (this percentage of pigment is expected to produce reasonable differences in color at relatively low levels of residual pigment). The weights for the various yellow dispersion and rinse water combinations are listed in Table 3. For these mortar mixes, the following ingredients and levels were employed: 165 g of white cement, 380 g concrete sand dried to saturated surface dried (SSD), water to meet a water to cement ratio of 0.47. The mortar mixture is prepared as described previously.

The control (STD) is provided by adding the Chromix™ L Yellow dispersion directly to the mortar mixture and adding the corresponding water required for the mixture. This standard then provides a mortar with a pure yellow pigment completely free of residual pigment to compare the dispensed yellow dispersion and rinse water combinations against for color accuracy.

TABLE 3

Mortar Mixture Recipes, Trial 1

| Mix - Rinse Water (lbs) | Mortar Mix Weights (grams) | | |
|---|---|---|---|
| | Dispersion Wt. | Water Added Wt. | Total |
| 1A - 16 lbs | 30.02 | 36.98 | 67.00 |
| 1B - 16 lbs | 30.19 | 36.81 | 67.00 |
| 2A - 12 lbs | 29.93 | 37.07 | 67.00 |
| 2B - 12 lbs. | 30.45 | 36.55 | 67.00 |
| 3A - 8 lbs | 30.63 | 36.37 | 67.00 |
| 3B - 8 lbs. | 29.58 | 37.42 | 67.00 |
| 4A - 4 lbs. | 30.45 | 36.55 | 67.00 |
| 4B - 4 lbs. | 30.81 | 36.19 | 67.00 |
| 5A - 2 lbs. | 30.81 | 36.19 | 67.00 |
| 5B - 2 lbs. | 30.19 | 36.81 | 67.00 |
| STD | 1.65 | 65.35 | 67.00 |

As seen in Table 4, the color accuracy to the standard is acceptable when the mass of rinse water dispensed through the manifold and meter is 12 lbs or greater. When the mass of rinse water drops below 12 lbs, according to this specific trial, the residual red pigment is sufficient to shift the color of the resultant mortar mixture enough for the residual pigment to be visible.

TABLE 4

Color Accuracy as a Function of Rinse Water, Trial 1

| Mix - Rinse Water (lbs) | Color Accuracy | |
|---|---|---|
| | Unacceptable | Acceptable |
| 1A - 16 lbs | | X |
| 1B - 16 lbs | | X |
| 2A - 12 lbs | | X |
| 2B - 12 lbs. | | X |
| 3A - 8 lbs | X | |
| 3B - 8 lbs. | X | |
| 4A - 4 lbs. | X | |
| 4B - 4 lbs. | X | |
| 5A - 2 lbs. | X | |
| 5B - 2 lbs. | X | |

Trial 2: Measurement Accuracy and Estimation of Rinse Water Required.

As with the previous trial, this evaluation was intended to assess the accuracy of the dispenser and quantify the amount of rinse water needed for the dispenser arrangement to reduce the amount of residual pigment below a visible level in a mortar containing white cement. As performed previously, the dispensing unit was instructed to dispense 2 lbs. of Light Red pigment dispersion, followed by a varied amount of rinse water. This was then followed by dispensing 1 lb. of the Yellow pigment dispersion and 16 lbs. of rinse water which was retained for determination of the necessary quantity of rinse water for the first pigment to provide acceptable color accuracy. The accuracy and reproducibility of the dispenser to dispense the proper mass of liquid pigment dispersion was measured and results are shown in Table 5. The dispenser was also found to accurately dispense rinse water levels between 4 lbs. and 32 lbs. The dispensing accuracy as reported here is significant because it represents a change in specific gravity in going from an iron oxide dispersion, to water, and back to another iron oxide dispersion.

TABLE 5

Dispenser Measurement Accuracy, Trial 2

| Mix | Light Red Dispersion Intended (lbs) | Light Red Dispersion Actual (lbs) | Rinse Water Intended (lbs) | Rinse Water Actual (lbs) | Yellow Dispersion Intended (lbs) | Rinse Water Intended (lbs) | Dispersion/Rinse Water Dispersion/Rinse Water Weigh Scale (lbs) | Dispersion/Rinse Water Mass Flow Meter (lbs) |
|---|---|---|---|---|---|---|---|---|
| WF1 | 2.00 | 1.98 | 16.00 | 16.05 | 1.00 | 16.00 | 17.00 | 17.01 |
| WF2 | 2.00 | 1.93 | 12.00 | 12.07 | 1.00 | 16.00 | 17.00 | 17.01 |
| WF3 | 2.00 | 2.01 | 8.00 | 8.05 | 1.00 | 16.00 | 16.90 | 16.97 |
| WF4 | 2.00 | 1.93 | 4.00 | 4.07 | 1.00 | 16.00 | 16.95 | 16.98 |
| WF5 | 2.00 | 1.96 | 24.00 | 24.05 | 1.00 | 16.00 | 16.95 | 17.00 |
| WF6 | 2.00 | 1.97 | 32.00 | 32.05 | 1.00 | 16.00 | 17.05 | 17.07 |

Measurement of color accuracy is made by dosing the Yellow dispersion and rinse water mixture at a level that would introduce 1.06% by weight iron oxide to cement into the mortar (this percentage of pigment is reduced from Trial 1 to evaluate the effect of residual pigment on lower pigment loadings). The weights for the various yellow dispersion and rinse water combinations are listed in Table 6. For these mortar mixes, the following ingredients and levels were employed: 165 g of white cement. 380 g concrete sand dried to saturated surface dried (SSD), water to meet a water to cement ratio of 0.47. The mortar mixture is prepared as described previously.

The comparative example (STD) is again provided by adding the Chromix™ L Yellow dispersion directly to the mortar mixture and adding the corresponding water required for the mixture.

TABLE 6

Dispersion and Mix Water Additions for Mortar Mixes, Trial 2

| Mix | Weight of Dispersion/Rinse Water (g) | Weight of Water Added (g) | Total of Water and Dispersion (g) |
|---|---|---|---|
| WF1 | 59.68 | 12.32 | 72 |
| WF2 | 59.68 | 12.32 | 72 |
| WF3 | 59.33 | 12.67 | 72 |
| WF4 | 59.51 | 12.49 | 72 |
| WF5 | 59.51 | 12.49 | 72 |
| WF6 | 59.86 | 12.14 | 72 |
| STD | 3.52 | 68.48 70.59 | 72 72.35 |

As seen in Table 7, the color accuracy to the standard is again acceptable when the mass of rinse water through the manifold and meter is 12 lbs or greater. When the mass of rinse water drops below 12 lbs, the residual red pigment is sufficient to shift the color of the resultant mortar mixture enough for the residual pigment to be visible.

TABLE 7

Color Accuracy vs. Rinse Water Level, Trial 2

| Mix | Rinse Water (lbs) Intended | Rinse Water (lbs) Actual | Color Accuracy Unacceptable | Color Accuracy Acceptable |
|---|---|---|---|---|
| WF1 | 16.00 | 16.05 |  | X |
| WF2 | 12.00 | 12.07 |  | X |
| WF3 | 8.00 | 8.05 | X |  |
| WF4 | 4.00 | 4.07 | X |  |
| WF5 | 24.00 | 24.05 |  | X |
| WF6 | 32.00 | 32.05 |  | X |

By way of comparison, the industry currently employs a 12 gallon weigh vessel. The weigh vessel is filled sequentially with pigment at the desired amount. Once filled with the desired amount of pigment dispersion, the contents are dispensed. After dispensing the pigment dispersion, the weigh vessel is then filled with water (12 gallons) and this is then dispensed to complete the rinsing procedure. The amount of water required for the rinse is equal to the volume of the weigh vessel. This mass of 96 lbs. is well in excess of the 121 lbs. found for the inventive dispenser. Thus the rinse water is considerably less and allows the inventive dispenser to be employed in markets were the amount of mix water is traditionally low. If a smaller weigh vessel is employed then the volume of the accumulated material is limited or successive batches need to be measured and dispensed, thus increasing the overall dispensing time.

There is also a time advantage with the inventive dispenser in that there is no retention of the material before it is dispensed. Additionally, the amount of rinse water has been dramatically reduced. With equivalent pumping equipment, the rate of delivery of water is the same and the time is solely dependent upon the amount of water being delivered, which, in the case of the inventive dispenser, is considerably less.

While the method and device for dispensing liquids have been described in connection with various embodiments, as shown in the various figures, it is to be understood that other similar embodiments may be used or modifications and additions may be made to the described embodiments for performing the same function without deviating therefrom. Furthermore, the various illustrative embodiments may be combined to produce the desired results. Therefore, the dispensing device should not be limited to any single embodiment, but rather construed in breadth and scope in accordance with the recitation of the appended claims.

I claim:

1. A method of dispensing a user-defined quantity of one or more additive liquids to a cementitious mixture comprising:
    (a) moving an additive liquid to a manifold;
    (b) moving said additive liquid from said manifold to a mass flow meter;
    (c) measuring the quantity of said additive liquid while said additive liquid is moving through said flow meter;
    (d) moving said additive liquid from said flow meter to said cementitious mixture;
    (e) optionally, repeating (a)-(d) for one or more additional additive liquids;
    (f) purging at least one of said manifold and said flow meter with a purgative fluid, wherein at least a portion of said purgative fluid is moved to said cementitious mixture;

wherein at least a portion of said additive liquid is recirculated prior to moving said additive liquid to said manifold; and wherein there is substantially no accumulation of additive liquid in the manifold or any components downstream of said manifold.

2. The method of claim 1, wherein said moving of said additive liquid comprises pumping said additive liquid to said manifold.

3. The method of claim 2, wherein said pumping of said additive liquid to said manifold comprises pumping said additive liquid with a dedicated pump.

4. The method of claim 1, comprising conducting said purging after measuring all additive liquids.

5. The method of claim 1, wherein said purgative fluid comprises at least one liquid, at least one gas or a combination thereof.

6. The method of claim 5, wherein said purgative fluid comprises at least one liquid purgative selected from the group consisting of water and water-based solutions.

7. The method of claim 5, wherein said purgative fluid comprises at least one gas selected from the group consisting of air, nitrogen, carbon dioxide, a Nobel gas and combinations thereof.

8. The method of claim 6, wherein said purgative fluid comprises water.

9. The method of claim 7, wherein said purgative fluid comprises air.

10. The method of claim 5, wherein said purging comprises purging with a liquid purgative followed by an air purgative.

11. The method of claim 10, wherein said purging comprises purging with water followed by purging with air.

12. The method of claim 8, wherein purging comprises:
supplying water to at least one of said manifold and said flow meter;
moving at least a portion of said water from said manifold to said flow meter; and
moving at least a portion of said water from said flow meter to either (i) a cementitious mixture or (ii) a temporary storage vessel and then to said cementitious mixture.

13. The method of claim 1. wherein said moving of said additive liquid through a flow meter comprises moving said liquid through a flow meter which does not rely upon the viscosity of the material flowing through the meter for measurement purposes.

14. The method of claim 13, wherein said moving of said additive liquid through a flow meter comprises moving said liquid through a flow meter selected from the group consisting of electromagnetic, Doppler ultrasonic, time-of-travel ultrasonic, Coriolis and thermal mass flow meters.

15. The method of claim 14, comprising moving said additive liquid through a Coriolis mass flow meter.

16. The method of claim 15, wherein said additive liquid comprises a pigment dispersion.

17. The method of claim 16, wherein said pigment dispersion comprises a thixotropic pigment dispersion.

18. The method of claim 17 comprising:
recirculating said thixotropic pigment dispersion prior to moving to said manifold;
moving said thixotropic pigment dispersion to said manifold;
moving said thixotropic pigment dispersion from said manifold to a Coriolis mass flow meter:
moving said thixotropic pigment dispersion from said Coriolis mass flow meter to a cementitious mixture: and
purging said manifold and Coriolis mass flow meter with water.

19. The method of claim 1, wherein said manifold comprises a plurality of inputs, an an output selectively in fluid communication with each of said inputs. wherein said output is substantially equidistant from each of said plurality of inputs, and flow paths extending between each of said inputs and said output, wherein said flow paths comprises a substantially same volume.

* * * * *